US012549347B2

(12) United States Patent
Gao et al.

(10) Patent No.: US 12,549,347 B2
(45) Date of Patent: Feb. 10, 2026

(54) DATA PROTECTION FOR REMOTE ARTIFICIAL INTELLIGENCE MODELS

(71) Applicant: INTERNATIONAL BUSINESS MACHINES CORPORATION, Armonk, NY (US)

(72) Inventors: Li Juan Gao, Xi'an (CN); Zhong Fang Yuan, Xi'an (CN); Ming Jin Chen, Zhe Jiang (CN); Tong Liu, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 918 days.

(21) Appl. No.: 17/457,717

(22) Filed: Dec. 6, 2021

(65) Prior Publication Data

US 2023/0179410 A1 Jun. 8, 2023

(51) Int. Cl.
| | |
|---|---|
| *H04L 9/08* | (2006.01) |
| *G06F 18/214* | (2023.01) |
| *G06F 40/40* | (2020.01) |
| *G06N 3/045* | (2023.01) |
| *G06V 30/19* | (2022.01) |

(52) U.S. Cl.
CPC .......... *H04L 9/0869* (2013.01); *G06F 18/214* (2023.01); *G06F 40/40* (2020.01); *G06N 3/045* (2023.01); *G06V 30/19147* (2022.01); *H04L 9/0819* (2013.01)

(58) Field of Classification Search
CPC ... H04L 9/0869; H04L 9/0819; H04L 9/0872; H04L 2209/42; G06F 18/214; G06F 40/40; G06F 40/242; G06F 40/30; G06N 3/045; G06N 3/044; G06N 3/08; G06N 3/084; G06V 30/19147
See application file for complete search history.

(56) References Cited

U.S. PATENT DOCUMENTS

| | | | | |
|---|---|---|---|---|
| 11,314,950 | B2* | 4/2022 | Wu | ........................ G06F 40/166 |
| 2009/0245516 | A1* | 10/2009 | Ravikiran | ............. H04L 9/0869 |
| | | | | 380/268 |
| 2010/0114920 | A1* | 5/2010 | Srivastava | .......... G06F 21/6254 |
| | | | | 707/E17.014 |

(Continued)

FOREIGN PATENT DOCUMENTS

| | | |
|---|---|---|
| CN | 106295392 A | 1/2017 |
| RU | 2691874 C2 | 5/2019 |
| WO | 2019071754 A1 | 4/2019 |

OTHER PUBLICATIONS

Meng Li et al., "Privynet: a Flexible Framework for Privacypreserving Deep Neural Network Training", Jan. 12, 2018, arXiv:1709.06161v3 (Year: 2018).*

(Continued)

*Primary Examiner* — Omar F Fernandez Rivas
(74) *Attorney, Agent, or Firm* — Garg Law Firm, PLLC; Rakesh Garg; Edward Wixted (57) ABSTRACT

A method, computer system, and a computer program product for data protection is provided. The present invention may include, generating an encoder network. The present invention may also include, encoding a training data using the generated encoder network, wherein the training data includes natural language data. The present invention may further include, training a deep learning model using the encoded training data.

20 Claims, 9 Drawing Sheets

(56) References Cited

U.S. PATENT DOCUMENTS

| | | | |
|---|---|---|---|
| 2019/0044918 A1 | 2/2019 | Doshi | |
| 2019/0156183 A1* | 5/2019 | Durham | G06N 3/047 |
| 2020/0034432 A1* | 1/2020 | Jain | G06N 3/0475 |
| 2020/0082272 A1* | 3/2020 | Gu | G06N 3/045 |
| 2020/0210553 A1* | 7/2020 | Lin | G06N 3/084 |
| 2020/0242466 A1 | 7/2020 | Mohassel | |
| 2021/0073393 A1 | 3/2021 | Jacobson | |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

DATA PROTECTION FOR REMOTE ARTIFICIAL INTELLIGENCE MODELS

BACKGROUND

The present invention relates generally to the field of computing, and more particularly to data protection.

Data-driven organizations that implement Artificial intelligence (AI) technology are more likely to outperform competitors in terms of revenue and profitability. In order to successfully scale AI throughout an organization, AI platforms may be utilized. An AI platform may be hosted on a remote computing server and may be used to train and deploy machine learning (ML) models at scale. As such, the AI platform may reduce the cost of intelligent data analysis and improve the utilization rate of hardware. However, existing AI platform workflows may raise some data security and privacy concerns because real data is often moved from one place to another, such as when it is transmitted over the internet from a user to the AI platform. With the expansion of AI platforms, it is important to provide users with access to intelligent services that ensures data security and privacy.

SUMMARY

Embodiments of the present invention disclose a method, computer system, and a computer program product for data protection. The present invention may include, generating an encoder network. The present invention may also include, encoding a training data using the generated encoder network, wherein the training data includes natural language data. The present invention may further include, training a deep learning model using the encoded training data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for protecting data that is transmitted to an AI platform for training and deploying machine learning (ML) models. As such, the present embodiment has the capacity to improve the technical field of data protection by using encoded data to train and deploy ML models on an AI platform. More specifically, a data protection program may generate an encoder network on a local device. Then, the data protection program may encode a training data, on the local device, using the generated encoder network, wherein the training data includes natural language data. Thereafter, the data protection program may train a deep learning model on a remote device using the encoded training data.

As described previously, data-driven organizations that implement AI technology are more likely to outperform competitors in terms of revenue and profitability. In order to successfully scale AI throughout an organization, AI platforms may be utilized. An AI platform may be hosted on a remote computing server and may be used to train and deploy ML models at scale. As such, the AI platform may reduce the cost of intelligent data analysis and improve the utilization rate of hardware. However, existing AI platform workflows may raise some data security and privacy concerns because real data is often moved from one place to another, such as when it is transmitted over the internet from a user to the AI platform. With the expansion of AI platforms, it is important to provide users with access to intelligent services that ensures data security and privacy.

Therefore, it may be advantageous to, among other things, provide a way to generate a unique neural network on a local device to convert a set of real data into a format that is secured for transmitting to a remote device for training and deploying ML models.

According to at least one embodiment, a use may specify a key on a local device and generate a neural network based on the key. In a training phase, the user may disturb a set of training data using the neural network on the local device and may send the disturbed training data to a cloud-based AI platform for data analysis and model training. In a prediction phase, the user may disturb a query data using the neural network on the local device and may transmit the disturbed query data to the cloud-based AI platform to receive a query prediction.

Figure 1:
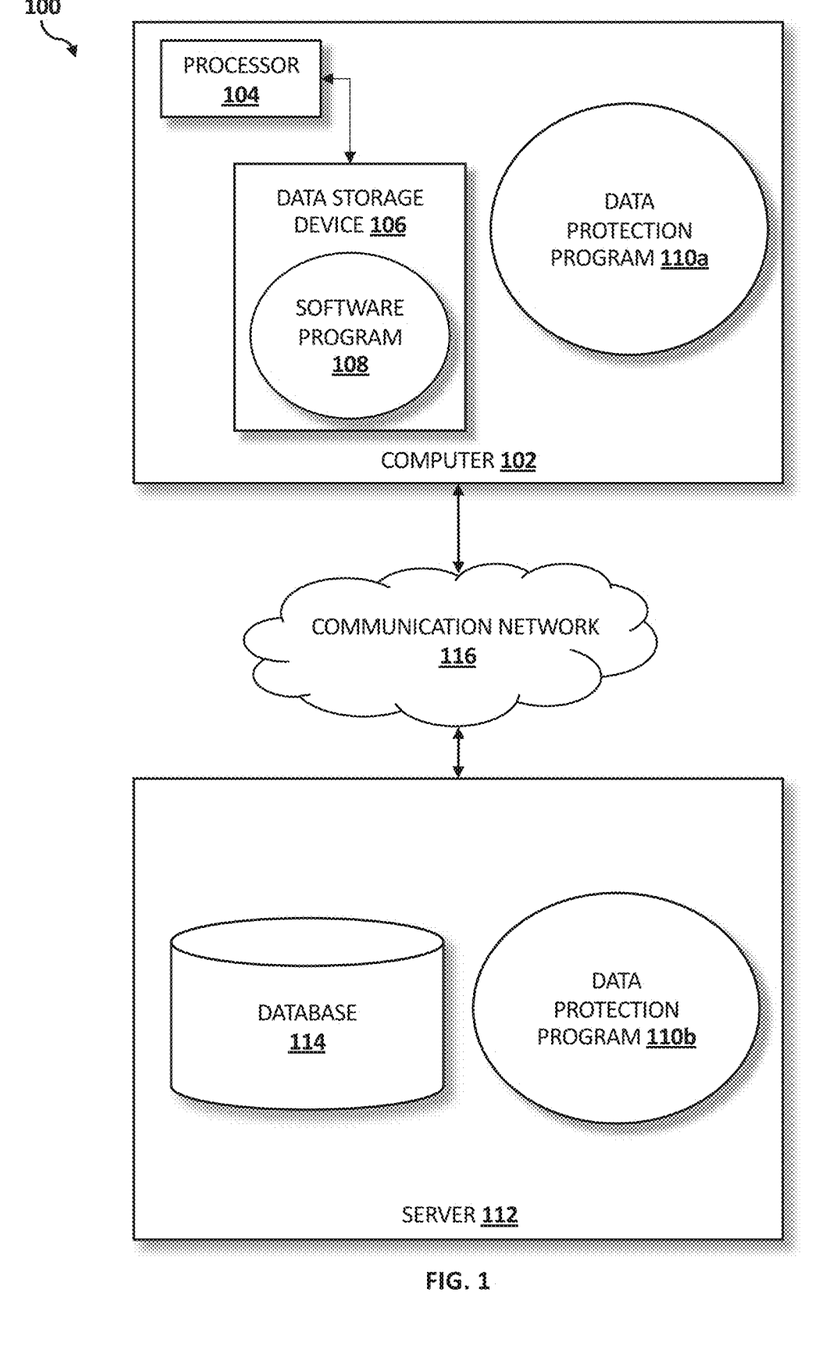
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data protection program 110*a*. The networked computer environment 100 may also include a server 112 that is enabled to run a data protection program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data protection program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data protection program 110a, 110b (respectively) to train a deep learning model on a remote device using training data that has been encoded on a local device using a neural network. The disclosed embodiments are explained in more detail below with respect to FIGS. 2 to 6.

Figure 2:
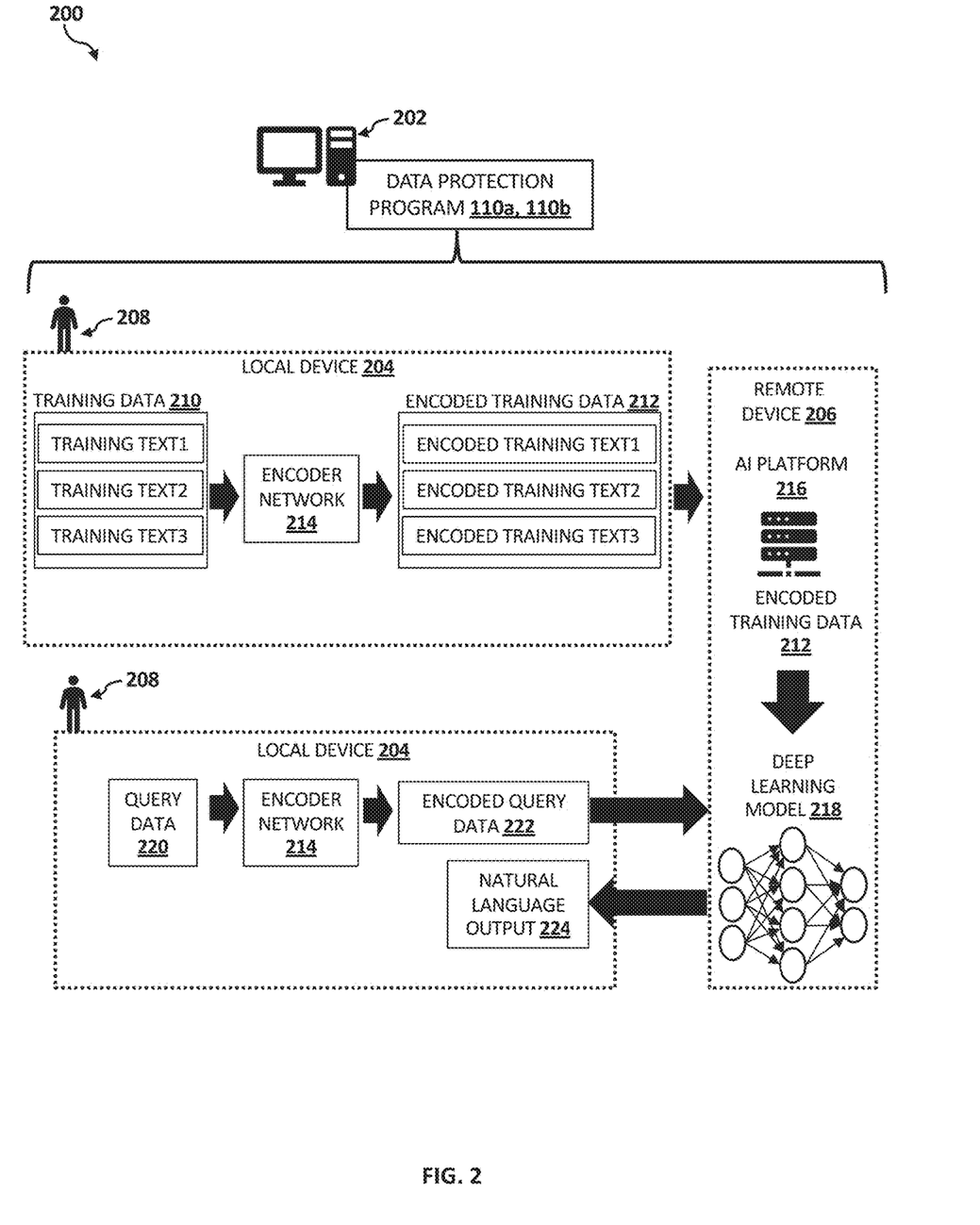
FIG. 2 is a schematic block diagram of a data protection environment according to at least one embodiment.

Referring now to FIG. 2, a schematic block diagram of a data protection environment 200 implementing the data protection program 110a, 110b according to at least one embodiment is depicted. FIG. 2 provides an overview of the data protection environment 200, which will be detailed further with reference to FIGS. 3-6.

According to one embodiment, the data protection environment 200 may include one or more components (e.g., client computer 102; server computer 112; communication network 116) of the computer environment 100 discussed above with reference to FIG. 1.

According to one embodiment, the data protection environment 200 may include a computer system 202 having a tangible storage device and a processor that is enabled to run the data protection program 110a, 110b. In one embodiment, the computer system 202 may include at least one local device 204 (e.g., client computer 102) and at least one remote device 206 (e.g., server computer 112). In various embodiments, the local device 204 and/or the remote device 206 of the computer system 302 may include a workstation, a personal computing device, a laptop computer, a desktop computer, a computing server, a thin-client terminal, a tablet computer, a smartphone, a smart watch or other smart wearable device, or other electronic devices. In at least one embodiment, the remote device 206 may also operate in a cloud computing service model, such as Software as a Service (SaaS), Platform as a Service (PaaS), or Infrastructure as a Service (IaaS). In one embodiment, the remote device 206 may also be located in a cloud computing deployment model, such as a private cloud, community cloud, public cloud, or hybrid cloud.

In one embodiment, the data protection program 110a, 110b may include a single computer program or multiple program modules or sets of instructions being executed by the processor of the computer system 202. The data protection program 110a, 110b may include routines, objects, components, units, logic, data structures, and actions that may perform particular tasks or implement particular abstract data types. The data protection n program 110a, 110b may be practiced in distributed cloud computing environments where tasks may be performed by local and/or remote processing devices which may be linked through the communication network 116. In one embodiment, the conversation program 110a, 110b may include program instructions that may be collectively stored on one or more computer-readable storage media. As such, in various embodiments, a first instance of the data protection program 110a, 110b may be implemented in the local device 204 and a second instance of the data protection program 110a, 110b may be implemented in the remote device 206.

According to one embodiment, the local device 204 may be associated with a user 208. In one embodiment, the data protection program 110a, 110b may enable the user 208 to interact with the local device 204 in order to convert a set of training data 210 into a corresponding set of encoded training data 212 using an encoder network 214. In one embodiment, the set of training data 210 (e.g., training text1; training text2; training text3) may be referred to as real data or plaintext data. In at least one embodiment, the training data 210 may be represented as natural language data (e.g., questions, statements, and responses). In one embodiment, each training text (e.g., training text 1) may include input features and one or more labels or known desired output values. In contrast to the natural language format of the training data 210, the encoded training data 212 (e.g., encoded training text1; encoded training text2; encoded training text3) output of the encoder network 214 may be represented as a string of numbers. As will be detailed further with reference to FIG. 3, the encoder network 214 may be generated and stored in the local device 204 and as such, may be unique to user 208 and local device 204.

According to one embodiment, the data protection program 110a, 110b may then enable the user 208 to transmit (e.g., via communication network 116) the encoded training data 212 to the remote device 206. In one embodiment, the remote device 206 may include a computing server or a cloud service hosting an AI platform 216. In various embodiments, the AI platform 216 may be referred to as a remote AI platform or a cloud-based AI platform. According to one embodiment, once the encoded training data 212 is sent to the AI platform 216, the AI platform 216 may use the encoded training data 212 to train a deep learning model 218. In one embodiment, training the deep learning model 218 may also include evaluating the accuracy of the model and tuning the hyperparameters of the model to improve model accuracy.

According to one embodiment, once the deep learning model 218 is trained using the encoded training data 212, the deep learning model 218 may be deployed via the AI platform 216. According to one embodiment, during a prediction phase, the data protection program 110a, 110b may enable the user 208 to transmit a prediction request from the local device 204 to the trained deep learning model 218 deployed via the AI platform 216. In one embodiment, the prediction request may include the data protection program 110a, 110b converting a query data 220 into an encoded query data 222 using the encoder network 214. In at least one embodiment, the encoded query data 222 may be generated using the same encoder network 214 that was used to convert the training data 210 into the encoded training data 212.

According to one embodiment, the data protection program 110a, 110b may then enable the user 208 to transmit (e.g., via communication network 116) the encoded query data 222 to the remote device 206. In one embodiment, the AI platform 216 may use the trained deep learning model 218 to process the prediction request associated with the encoded query data 222. In one embodiment, the trained deep learning model 218 may generate a natural language prediction based on the encoded query data 222. Thereafter, the AI platform 216 may transmit a response to the prediction request back to the local device 204 as a natural language output 224.

Figure 3:
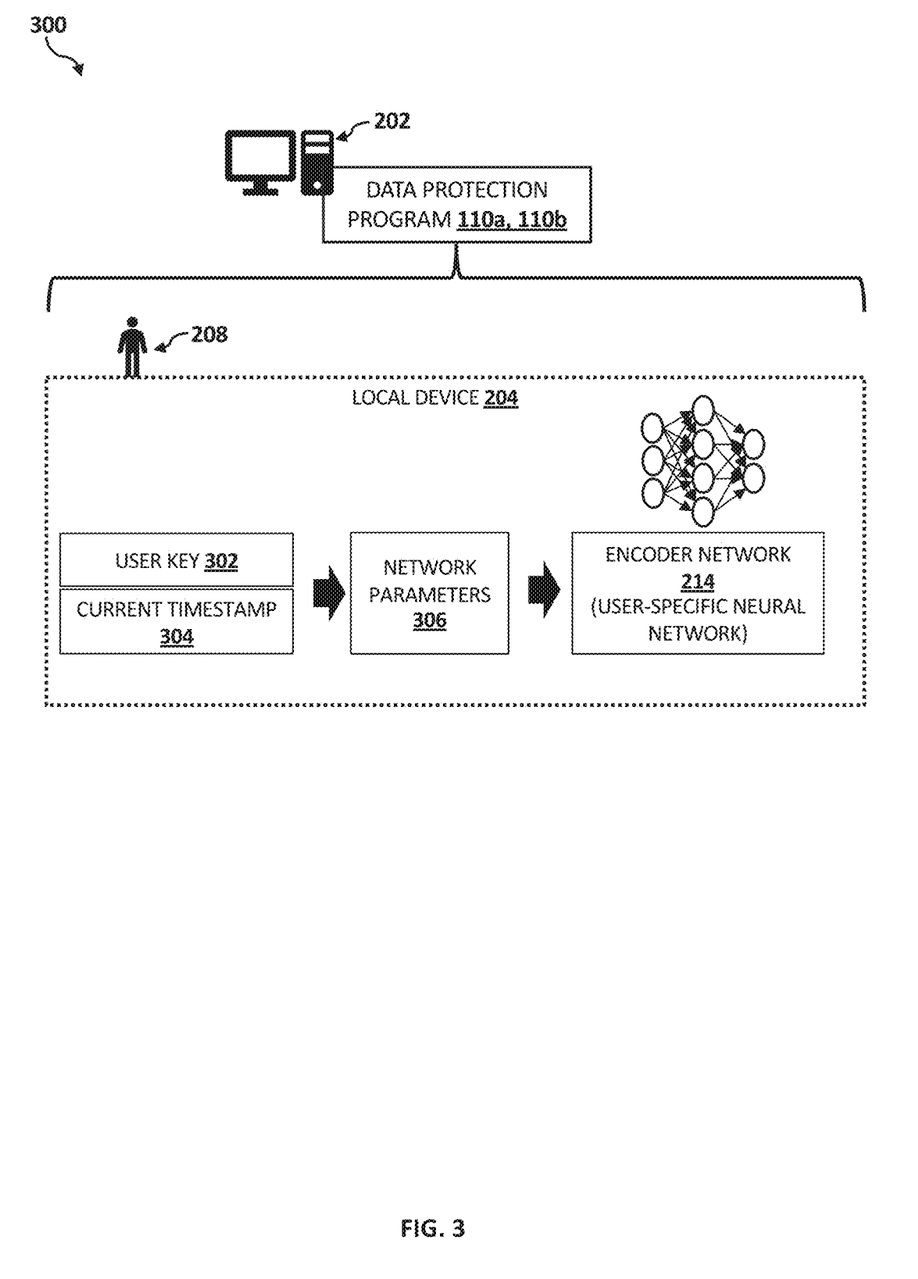
FIG. 3 is a schematic block diagram of an encoder generating environment according to at least one embodiment.

Referring now to FIG. 3, a schematic block diagram of a encoder generating environment 300 implementing the data protection program 110a, 110b according to at least one embodiment is depicted.

According to one embodiment, the encoder generating environment 300 may include one or more components (e.g., client computer 102; server computer 112; communication network 116) of the computer environment 100 discussed above with reference to FIG. 1 and one or more components of the data protection environment 200 discussed above with reference to FIG. 2.

As described previously with reference to FIG. 2, the data protection program 110a, 110b may enable the user 208 to interact with the local device 204 in order to generate and store the encoder network 214. More specifically, in one embodiment, the data protection program 110a, 110b may enable user 208 to select a unique user key 302. In another embodiment, the data protection program 110a, 110b may automatically generate the unique user key 302 for user 208. In one embodiment, once the data protection program 110a, 110b receives the unique user key 302, the data protection program 110a, 110b may use the unique user key 302 in combination with a current timestamp 304 to initialize a set of network parameters 306. In one embodiment, the network parameters 306, initialized based on the unique user key 302 and the current timestamp 304 as seeds, may be implemented as the parameters in the encoder network 214. As a result of this initialization process (e.g., seeding with unique user key 302 and current timestamp 304), it is contemplated that the parameters in the neural network (e.g., network parameters 306) may include random numbers. As such, the encoder network 214, which comprises a neural network having parameters (e.g., network parameters 306) that are random numbers generated based on the unique user key 302 and current timestamp 304 as seeds, may be referred to as a user-specific neural network. According to one embodiment, and as will be further detailed with reference to FIG. 4, the data protection program 110a, 110b may enable the encoder network 214 to convert natural language data (e.g., questions/statements or any other text) to an embedding (e.g., a representation of words in the form of a real-valued vector). Thereafter, the data protection program 110a, 110b may enable the encoder network 214 to map the embedding from a relatively low-dimensional space to a high-dimensional space to ensure the privacy of the underlying natural language data (e.g., training data 210).

Figure 4:
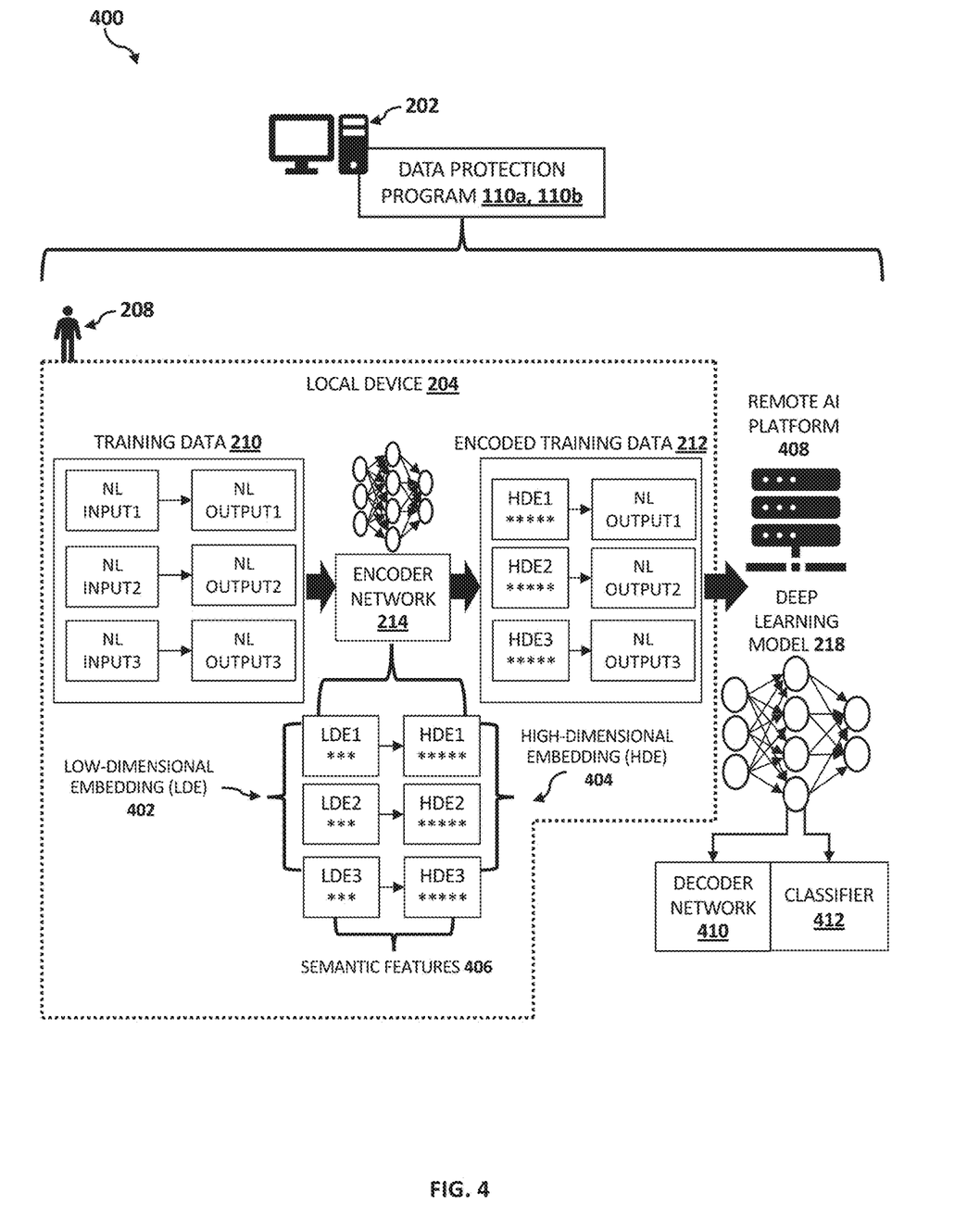
FIG. 4 is a schematic block diagram of an encoded training environment according to at least one embodiment.

Referring now to FIG. 4, a schematic block diagram of a encoded training environment 400 implementing the data protection program 110a, 110b according to at least one embodiment is depicted.

According to one embodiment, the encoded training environment 400 may include one or more components (e.g., client computer 102; server computer 112; communication network 116) of the computer environment 100 discussed above with reference to FIG. 1, one or more components of the data protection environment 200 discussed above with reference to FIG. 2, and one or more components of the encoder generating environment 300 discussed above with reference to FIG. 3.

In one embodiment, the data protection program 110a, 110b may enable the user 208 to interact with the local device 204 in order to convert the set of training data 210 into the corresponding set of encoded training data 212 using the encoder network 214 (e.g., user-specific neural network). According to one embodiment, the training data 210 may include one or more natural language (NL) inputs (e.g., NL input1; NL input2; NL input3) and one or more known/desired natural language output values/labels (e.g., NL output1; NL output2; NL output3).

According to one embodiment, the data protection program 110a, 110b may implement the encoder network 214 to convert the natural language inputs (e.g., NL input1; NL input2; NL input3) of the training data 210 to corresponding embeddings while maintaining the natural language data of the output values/labels (e.g., NL output1; NL output2; NL output3). According to one embodiment, an embedding may refer to the representation of words using a vector of numerical values to reflect its semantic meaning. In one embodiment, embeddings may encode the meaning of a word such that the words that are closer in the vector space are expected to be similar in meaning. As such, embeddings representing words in an N-dimensional vector space that are semantically similar (e.g., "king" and "monarch") or semantically related (e.g., "bird" and "fly") may be closer in the vector space (e.g., the distance between vectors). In practice, an embedding may include a string of numbers (e.g., the vector) and may provide a unique numerical identifier for a corresponding word.

According to one embodiment, embeddings may be represented as low-dimensional vectors (e.g., less input features) or high-dimensional vectors (e.g., more input features), where the high-dimensional vector may include a longer string of numbers. In one embodiment, the encoder network 214 may convert the natural language inputs (e.g., NL input1; NL input2; NL input3) of the training data 210 to corresponding low-dimensional embeddings (LDE) 402. Then, the encoder network 214 may map the LDE 402 (e.g., relatively low-dimensional embeddings) to corresponding high-dimensional embeddings (HDE) 404. It is contemplated that mapping the LDE 402 to the HDE 404 may increase the security/privacy of the training data 210 because high-dimensional vectors may include a longer string of numbers. However, the encoder network 214 may be implemented to ensure that one or more semantic features 406 captured by the LDE 402 are also represented by the HDE 404.

According to one embodiment, the encoded training data 212 output from the encoder network 214 may include a set of HDEs representing the set of NL inputs and a set of NL outputs that are unchanged. For example, the "NL input1; NL output1" pair of the training data 210 may be converted by the encoder network 214 to the "HDE1; NL output1" pair, where the NL input1 may be encoded into the HDE1 and the NL output1 may be maintained as natural language data.

According to one embodiment, the data protection program 110a, 110b may then enable the user 208 to transmit (e.g., via communication network 116) the encoded training data 212 to a remote AI platform 408, which may refer to the AI platform 216 on the remote device 206, as illustrated in FIG. 2. According to one embodiment, once the encoded training data 212 is sent to the remote AI platform 408, the remote AI platform 408 may use the encoded training data 212 to train the deep learning model 218. In one embodiment, the deep learning model 218 may include a neural network having many layers, where the first few layers (e.g., one or more hidden layers) may include a decoder network 410. According to one embodiment, if the task of the deep learning model 218 is text classification, the last few layers (e.g., one or more hidden layers) may include the structure of a text classification model (e.g., classifier 412). In this way, the trained deep learning model 218 may be equivalent to integrating the decoder network 410 and the classification model (e.g., classifier 412). Since the training input of the deep learning model 218 may include high-dimensional embeddings (HDE), decoder network 410 may be referred to as a decoder network for high-dimensional embeddings. Further, it is contemplated that the training of the decoder network 410 may not need the parameters (e.g., user key 302 and current timestamp 304 seeding network parameters 306) of the encoder network 214 to process the encoded training data 212. Instead, according to one embodiment, the training of the decoder network 410 may continuously optimize the deep learning model 218 according to the specific HDEs and corresponding label (e.g., HDE1; NL output1). By incorporating the decoder network 410 within the deep learning model 218, it is contemplated that the semantic features 406 of the underlying training data 210 will not be lost as a result of converting the training data 210 to the encoded training data 212. Further, even if the encoded training data 212 is somehow intercepted by an adversarial third-party, the adversarial third-party may only see a long string of numbers and not the natural language inputs. Although these long string of numbers (e.g., HDEs) may be meaningful to the deep learning model 218 having the decoder network 410, the adversarial third-party may only see random numbers.

Figure 5:
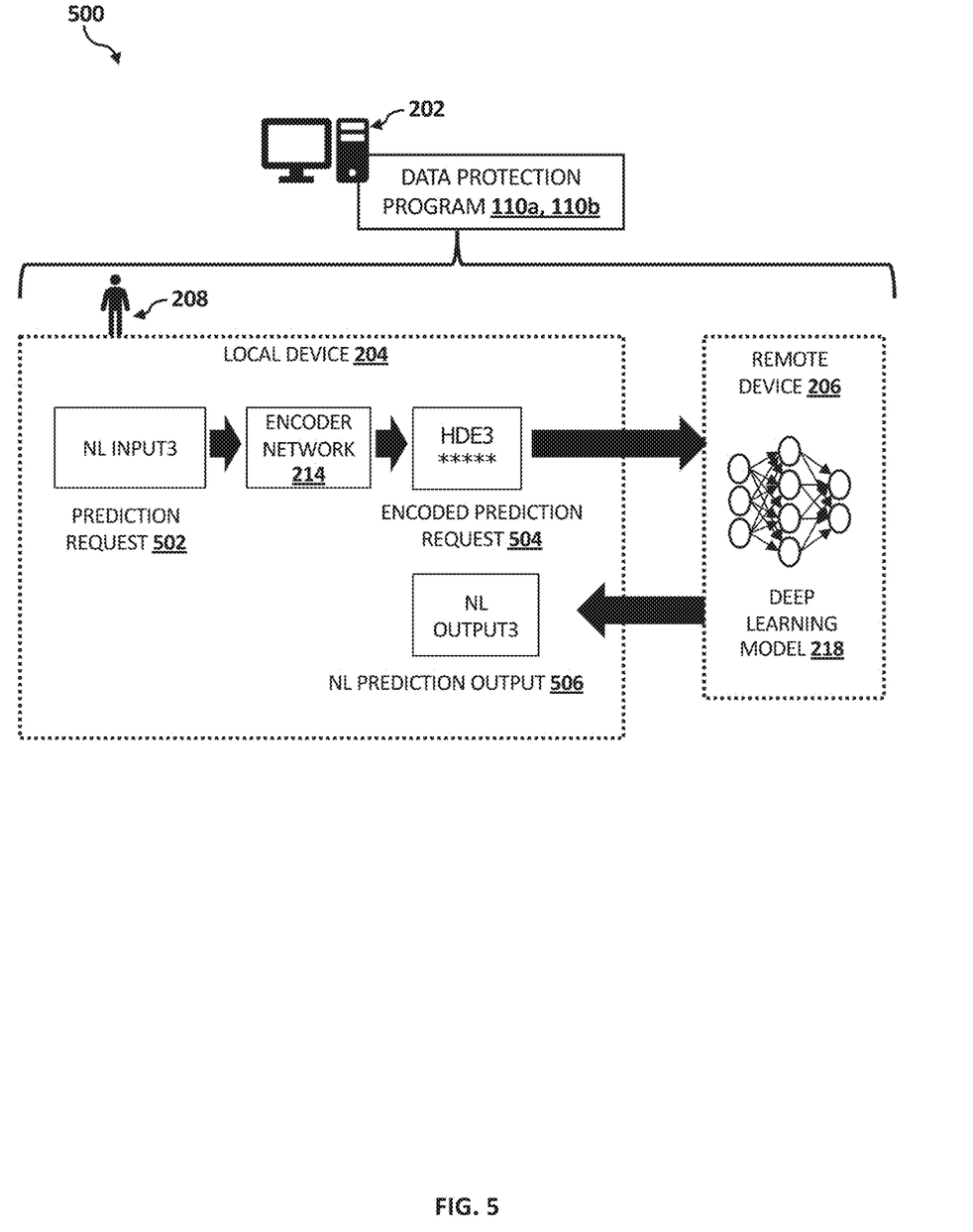
FIG. 5 is a schematic block diagram of a prediction environment according to at least one embodiment.

Referring now to FIG. 5, a schematic block diagram of a prediction environment 500 implementing the data protection program 110a, 110b according to at least one embodiment is depicted.

According to one embodiment, the prediction environment 500 may include one or more components (e.g., client computer 102; server computer 112; communication network 116) of the computer environment 100 discussed above with reference to FIG. 1, one or more components of the data protection environment 200 discussed above with reference to FIG. 2, one or more components of the encoder generating environment 300 discussed above with reference to FIG. 3, and one or more components of the encoded training environment 400 discussed above with reference to FIG. 4.

According to one embodiment, once the deep learning model 218 is trained using the encoded training data 212, the deep learning model 218 may be deployed via the AI platform 216. According to one embodiment, during a prediction phase, the data protection program 110a, 110b may enable the user 208 to transmit a prediction request 502 (e.g., query data 220 in FIG. 2) from the local device 204 to the trained deep learning model 218 deployed via the remote device 206 (e.g., hosting AI platform 216). In one embodiment, the data protection program 110a, 110b implement the encoder network 214 used during the model training phase to convert the prediction request 502 into an encoded prediction request 504 (e.g., encoded query data 222 in FIG. 2). In one embodiment, the prediction request 502 may include a natural language (NL) input (e.g., NL input3) and the encoded prediction request 504 may include a high-dimensional embedding (HDE) representation (e.g., HDE3) of the prediction request 502.

According to one embodiment, the data protection program 110a, 110b may then enable the user 208 to transmit (e.g., via communication network 116) the encoded prediction request 504 to the remote device 206. In one embodiment, the trained deep learning model 218 may process the prediction request and generate a NL prediction output 506 (e.g., NL output 224 in FIG. 2) based on the encoded prediction request 504. Thereafter, the remote device 206 may transmit the NL prediction output 506 (e.g., NL output3) back to the local device 204.

Figure 6:
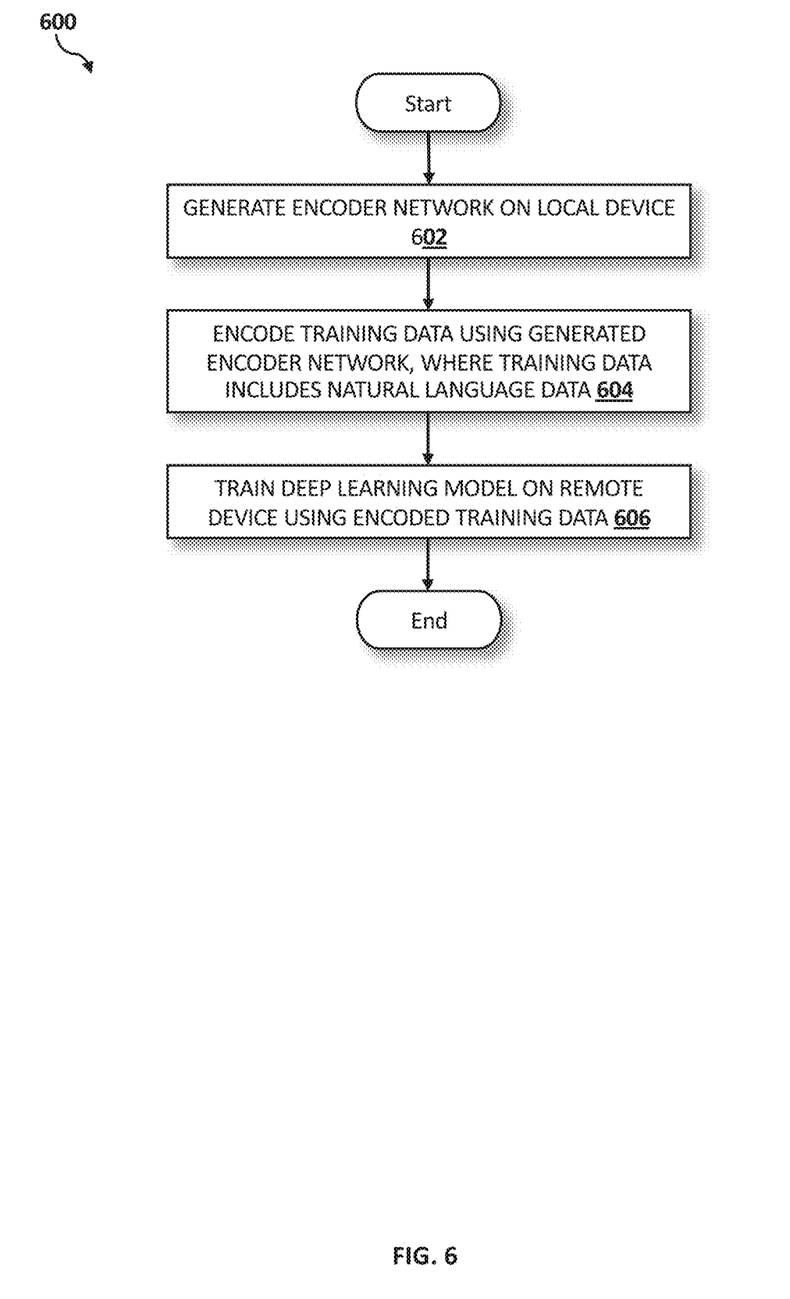
FIG. 6 is an operational flowchart illustrating a process for data protection according to at least one embodiment

Referring now to FIG. 6, an operational flowchart illustrating an exemplary data protection process 600 used by the data protection program 110a,110b according to at least one embodiment is depicted. According to one embodiment, FIG. 6 provides a general description of the data protection process 600 which was previously detailed with reference to FIGS. 2 to 5.

At 602, an encoder network is generated on a local device. According to one embodiment, the data protection program 110a, 110b may generate a user-specific neural network on a local device associated with a user, a described previously with reference to FIG. 3. According to one embodiment, the data protection program 110a, 110b may receive a unique user key and a current timestamp and generate the neural network based on the received unique user key and the current timestamp, as described previously with reference to FIG. 3. According to one embodiment, the data protection program 110a, 110b may initialize a set of network parameters for the generated neural network based on the received unique user key and the current timestamp as seeds. As such, the initialized set of network parameters may include a random set of numbers, as described previously with reference to FIG. 3.

Then at 604, training data including natural language data is encoded using the generated encoder network. According to one embodiment, the data protection program 110a, 110b may implement the encoder network to convert the natural language data of the training data to a set of embeddings. According to one embodiment, the training data may include at least one input and at least one output, as described previously with reference to FIG. 4. According to one embodiment, the data protection program 110a, 110b may implement the encoder network to convert the at least one input from the natural language data to an embedding and maintain the natural language data of the at least one output.

According to one embodiment, the data protection program 110a, 110b may implement the encoder network to map the set of embeddings from a relatively low-dimensional embedding to a high-dimensional embedding to increase data privacy of the training data, as described previously with reference to FIG. 4. According to one embodiment, the data protection program 110a, 110b may implement the encoder network to determine a set of semantic features captured by the relatively low-dimensional embedding, as described previously with reference to FIG. 4. Then, and the data protection program 110a, 110b may implement the encoder network to maintain the determined set of semantic features when mapping to the high-dimensional embedding, as described previously with reference to FIG. 4.

Thereafter at 606, a deep learning model on a remote device is trained using the encoded training data. According to one embodiment, during a prediction phase, the data protection program 110a, 110b may implement the encoder network to encode a prediction request on the local device using the user-specific neural network, as described previously with reference to FIG. 5. Then, the data protection program 110a, 110b may transmitting the encoded prediction request from the local device to the trained deep learning model stored on the remote device. Thereafter, the data protection program 110a, 110b may receive, on the local device, a natural language output from the trained deep learning model responsive to the encoded prediction request, as described previously with reference to FIG. 5.

Accordingly, the data protection program 110a, 110b may improve the functionality of a computer because the data protection program 110a, 110b may enable the computer to train a deep learning model on a remote device using training data that has been encoded on a local device using a user-specific neural network.

It may be appreciated that FIGS. 2 to 6 provide only an illustration of one embodiment and do not imply any limitations with regard to how different embodiments may be implemented. Many modifications to the depicted embodiment(s) may be made based on design and implementation requirements.

Figure 7:
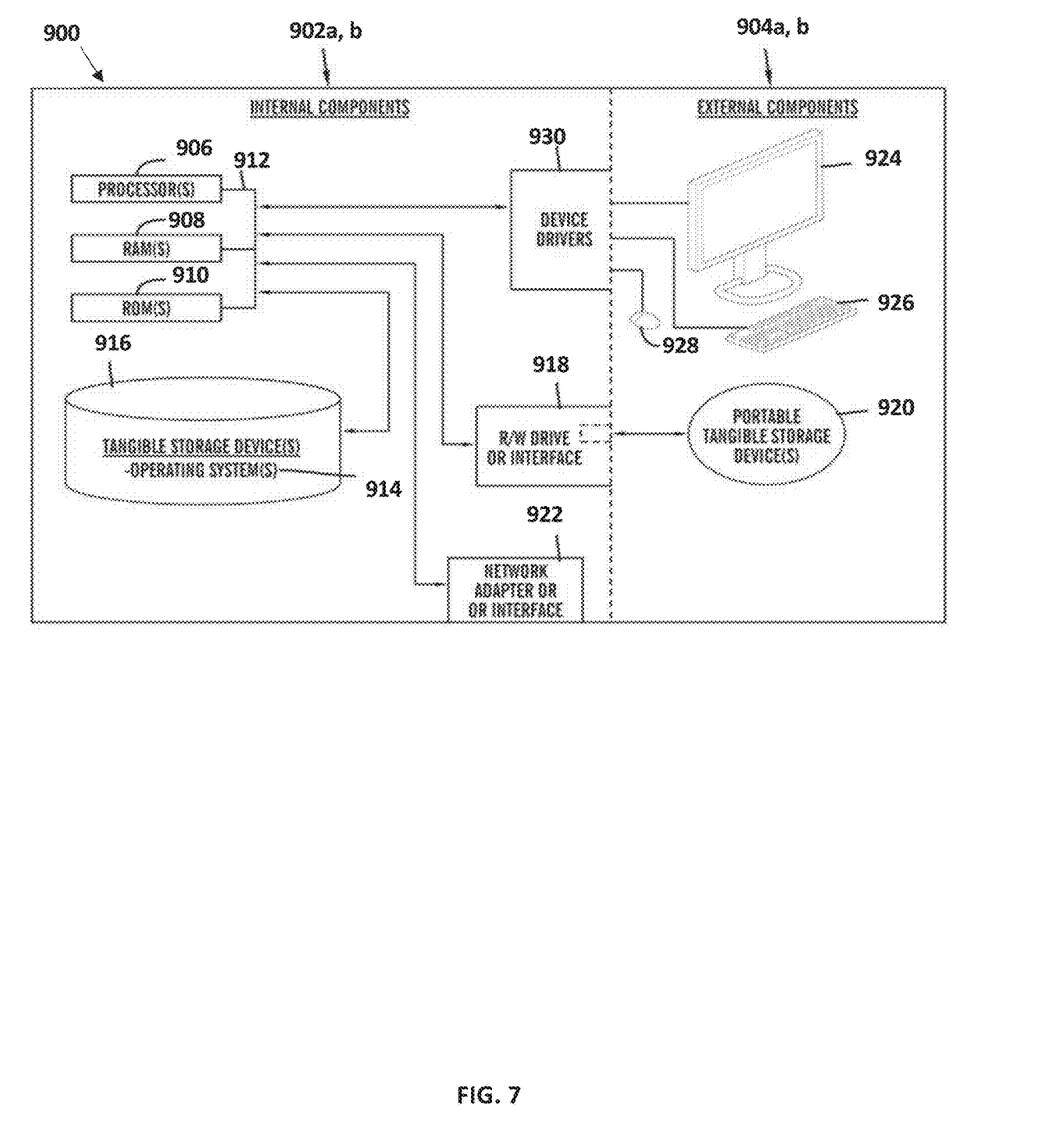
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the data protection program 110a in client computer 102, and the data protection program 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data protection program 110a and 110b can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the data protection program 110a in client computer 102 and the data protection program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data protection program 110a in client computer 102 and the data protection program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
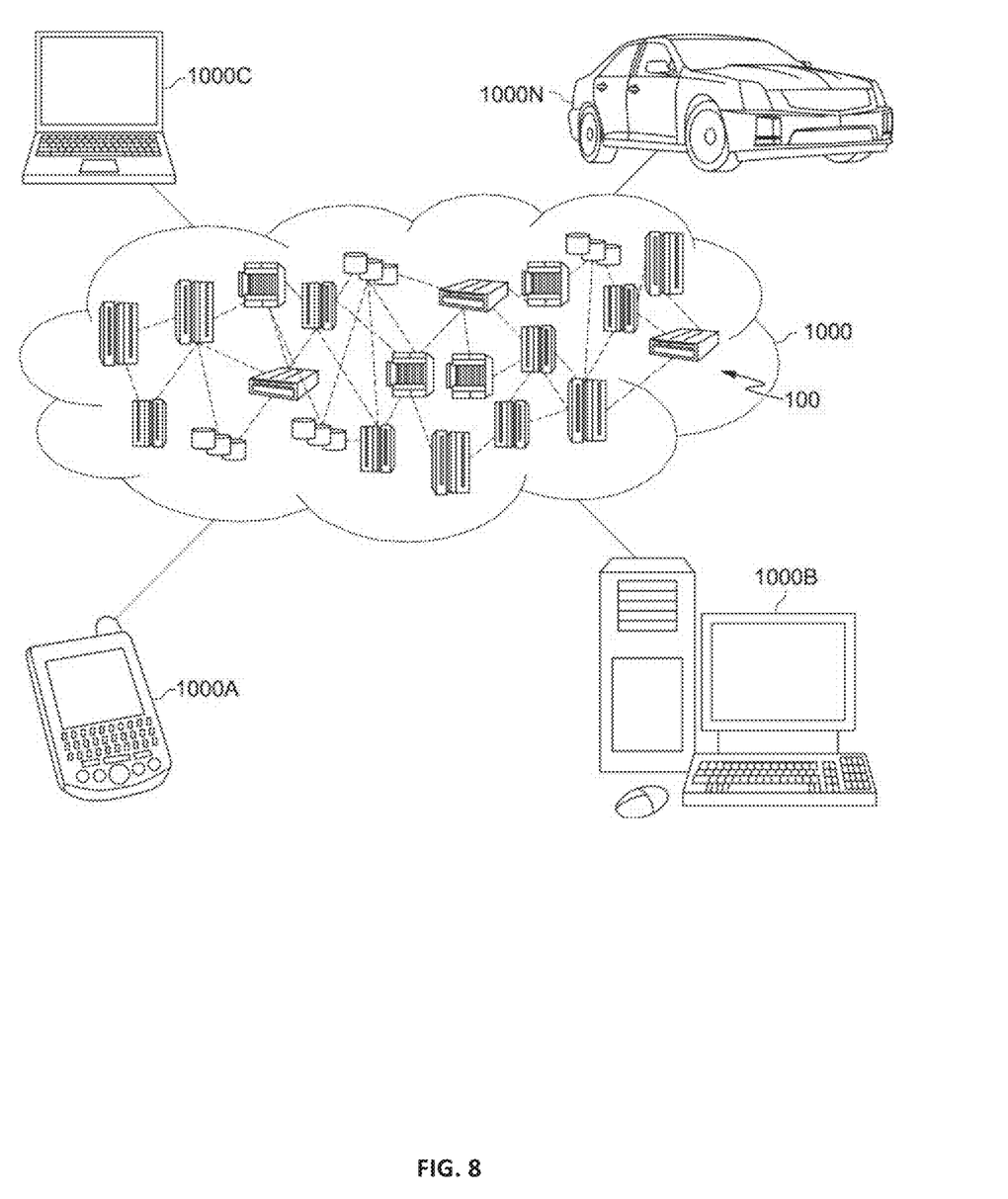
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
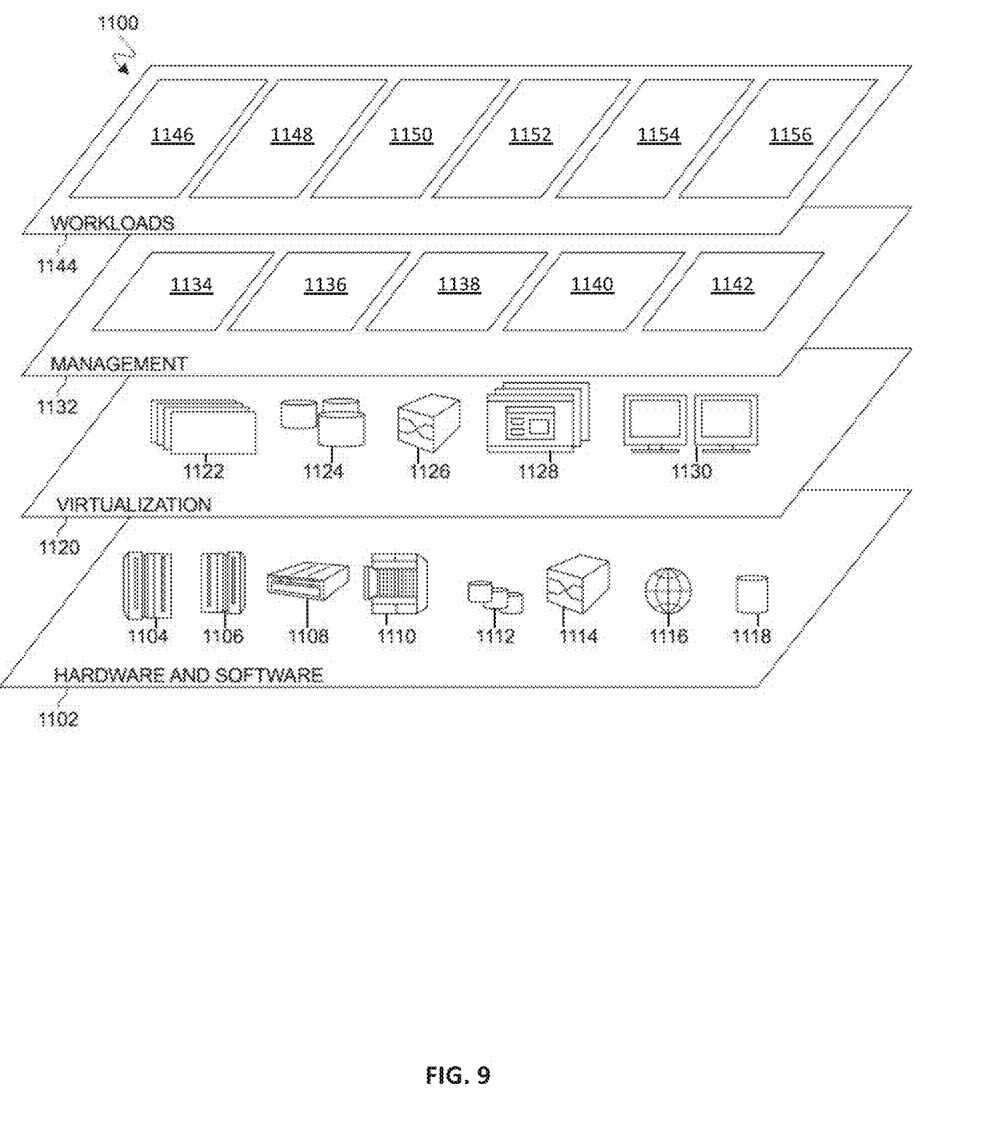
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data protection 1156. A data protection program 110a, 110b provides a way to train a deep learning model on a remote device using training data that has been encoded on a local device using a user-specific neural network.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    enhancing data protection of training data in remote training of machine learning (ML) models configured on remote artificial intelligence (AI) platforms, the enhancing comprising:
        generating an encoder network according to a set of seeding network parameters;
        encoding a training data using the generated encoder network, wherein the training data includes natural language data;
        configuring a deep learning (DL) model as an integration of a decoder network and a classifier network, wherein the decoder network comprises a first subset of a set of hidden layers of the DL model and the classifier network comprises a second subset of the set of hidden layers of the DL model; and
        executing a training mode of the DL model using the encoded training data such that the training optimizes the decoder network component of the DL model while omitting using the set of seeding network parameters in training the decoder network component of the DL model, the executing outputting a trained DL model.

2. The method of claim 1,
    wherein generating the encoder network further comprises generating a user-specific neural network on a local device associated with a user, and
    wherein training the deep learning model using the encoded training data further comprises transmitting the encoded training data to a remote device storing the deep learning model.

3. The method of claim 1, wherein generating the encoder network further comprises:
    receiving a unique user key and a current timestamp; and
    generating a neural network based on the received unique user key and the current timestamp.

4. The method of claim 3, wherein generating the neural network based on the received unique user key and the current timestamp further comprises:
    initializing the set of seeding network parameters for the generated neural network based on the received unique user key and the current timestamp as seeds, such that the initialized set of seeding network parameters includes a plurality of random numbers.

5. The method of claim 1, wherein encoding the training data using the generated encoder network further comprises:
    converting the natural language data of the training data to a plurality of embeddings; and
    mapping the plurality of embeddings from a relatively low-dimensional embedding to a high-dimensional embedding to increase data privacy of the training data.

6. The method of claim 5, wherein mapping the plurality of embeddings from the relatively low-dimensional embedding to the high-dimensional embedding further comprises:
    determining a set of semantic features captured by the relatively low-dimensional embedding; and
    maintaining the determined set of semantic features in the high-dimensional embedding.

7. The method of claim 1, wherein the training data comprises at least one input and at least one output, and wherein encoding the training data further comprises:
    converting the at least one input from the natural language data to an embedding; and
    maintaining the natural language data of the at least one output.

8. The method of claim 2, further comprising:
    encoding a prediction request on the local device using the generated user-specific neural network;
    transmitting the encoded prediction request from the local device to the trained deep learning model stored on the remote device; and
    receiving, on the local device, a natural language output from the trained deep learning model responsive to the encoded prediction request.

9. A computer system for data protection, comprising:
    one or more processors,
    one or more computer-readable memories,
    one or more computer-readable tangible storage media, and
    program instructions stored on at least one of the one or more computer-readable tangible storage media for execution by at least one of the one or more processors via at least one of the one or more memories, wherein the computer system is capable of performing a method comprising:
        enhancing data protection of training data in remote training of machine learning (ML) models configured on remote artificial intelligence (AI) platforms, the enhancing comprising:
            generating an encoder network according to a set of seeding network parameters;
            encoding a training data using the generated encoder network, wherein the training data includes natural language data;
            configuring a deep learning (DL) model as an integration of a decoder network and a classifier network, wherein the decoder network comprises a first subset of a set of hidden layers of the DL model and the classifier network comprises a second subset of the set of hidden layers of the DL model; and executing a training mode of the DL model using the encoded training data such that the training optimizes the decoder network component of the DL model while omitting using the set of seeding network parameters in training the decoder network component of the DL model, the executing outputting a trained DL model.

10. The computer system of claim 9, wherein generating the encoder network further comprises generating a user-specific neural network on a local device associated with a user, and wherein training the deep learning model using the encoded training data further comprises transmitting the encoded training data to a remote device storing the deep learning model.

11. The computer system of claim 9, wherein generating the encoder network further comprises:

receiving a unique user key and a current timestamp; and generating a neural network based on the received unique user key and the current timestamp.

12. The computer system of claim 11, wherein generating the neural network based on the received unique user key and the current timestamp further comprises:

initializing the set of seeding network parameters for the generated neural network based on the received unique user key and the current timestamp as seeds, such that the initialized set of seeding network parameters includes a plurality of random numbers.

13. The computer system of claim 9, wherein encoding the training data using the generated encoder network further comprises:

converting the natural language data of the training data to a plurality of embeddings; and mapping the plurality of embeddings from a relatively low-dimensional embedding to a high-dimensional embedding to increase data privacy of the training data.

14. The computer system of claim 13, wherein mapping the plurality of embeddings from the relatively low-dimensional embedding to the high-dimensional embedding further comprises:

determining a set of semantic features captured by the relatively low-dimensional embedding; and maintaining the determined set of semantic features in the high-dimensional embedding.

15. The computer system of claim 9, wherein the training data comprises at least one input and at least one output, and wherein encoding the training data further comprises:

converting the at least one input from the natural language data to an embedding; and maintaining the natural language data of the at least one output.

16. The computer system of claim 10, further comprising:

encoding a prediction request on the local device using the generated user-specific neural network;

transmitting the encoded prediction request from the local device to the trained deep learning model stored on the remote device; and receiving, on the local device, a natural language output from the trained deep learning model responsive to the encoded prediction request.

17. A computer program product for data protection, comprising:

one or more computer-readable storage media and program instructions collectively stored on the one or more computer-readable storage media, the program instructions executable by a processor to cause the processor to perform a method comprising:

enhancing data protection of training data in remote training of machine learning (ML) models configured on remote artificial intelligence (AI) platforms, the enhancing comprising:

generating an encoder network according to a set of seeding network parameters;

encoding a training data using the generated encoder network, wherein the training data includes natural language data;

configuring a deep learning (DL) model as an integration of a decoder network and a classifier network, wherein the decoder network comprises a first subset of a set of hidden layers of the DL model and the classifier network comprises a second subset of the set of hidden layers of the DL model; and executing a training mode of the DL model using the encoded training data such that the training optimizes the decoder network component of the DL model while omitting using the set of seeding network parameters in training the decoder network component of the DL model, the executing outputting a trained DL model.

18. The computer program product of claim 17, wherein generating the encoder network further comprises generating a user-specific neural network on a local device associated with a user, and wherein training the deep learning model using the encoded training data further comprises transmitting the encoded training data to a remote device storing the deep learning model.

19. The computer program product of claim 17, wherein generating the encoder network further comprises:

receiving a unique user key and a current timestamp; and generating a neural network based on the received unique user key and the current timestamp.

20. The computer program product of claim 19, wherein generating the neural network based on the received unique user key and the current timestamp further comprises:

initializing the set of seeding network parameters for the generated neural network based on the received unique user key and the current timestamp as seeds, such that the initialized set of seeding network parameters includes a plurality of random numbers.

* * * * *